2,764,234

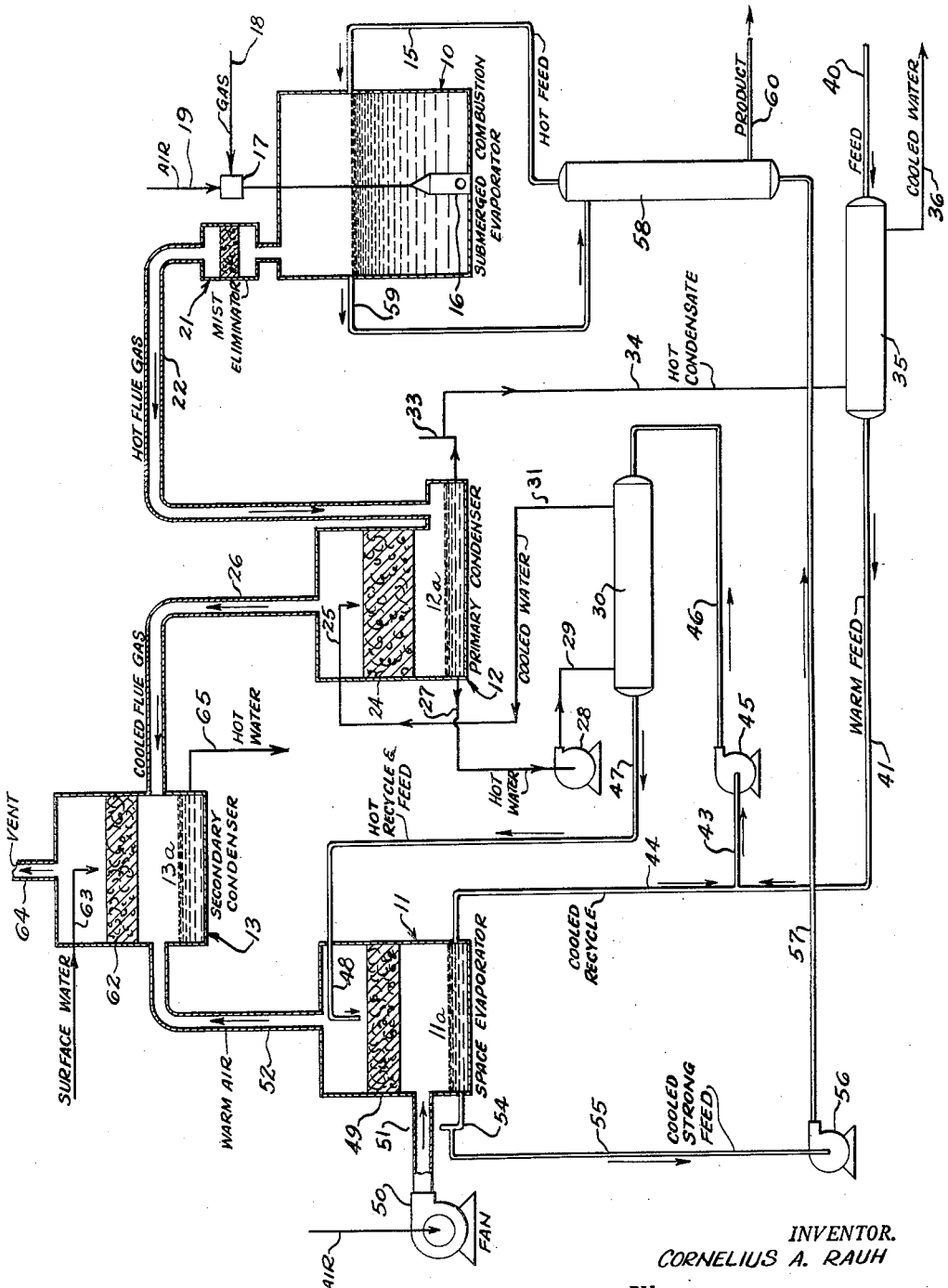

METHOD AND APPARATUS FOR CONCENTRATING LIQUIDS

Cornelius Anthony Rauh, Akron, Ohio

Application July 5, 1952, Serial No. 297,250

10 Claims. (Cl. 159—16)

The present invention relates to improvements in methods and apparatus for heating, evaporating or concentrating liquids, particularly for processing industrial residues.

Where solutions are to be concentrated in industrial processes, it is often of great importance that the energy consumption be reduced to a minimum in order that the product involved in the process may be saleable at a reasonable price. At the other extreme, in the disposal of industrial waste involving evaporation of large volumes of liquid, energy consumption and heat waste must be kept to a minimum to avoid burdening the main processes and products with high waste disposal charges. In the prior art many methods and apparatus have been devised for the conservation of heat energy or the minimization of energy requirements in processes involving the heating or evaporation of liquids. To economize on the heat consumption and other energy requirements heat exchangers have been used in many forms whereby heat may be recovered from the concentrated product or from the vapors resulting from the evaporation thereof for utilization at another point of the process or plant where heat is required, for example in preheating cold feed being injected into the main evaporator or concentrator. Multiple effect evaporation, wherein condensible vapors from a high temperature evaporator are used as the heating medium in a second evaporator operating under a vacuum and hence at a lower boiling point, with perhaps a similar re-use of the condensible vapors produced in the second evaporator as the heating medium in the third and lower pressure evaporator, has been used to effect great economy in the heat energy requirement for evaporation. However, equipment costs are high, involving not only vessels constructed to withstand external pressure, but also auxiliary vacuum and control equipment. In addition, such systems cannot handle gas streams which contain any considerable quantity or volumes of gases which are noncondensible in practice. The present invention contemplates utilizing the heat energy of vapors or condensible vapors and noncondensible gases from a high temperature evaporator to attain the energy economy of multiple effect evaporation without use of vacuum operation with its attendant equipment and its limitations, but rather with equipment comparatively simple and inexpensive in construction and stable in operation. By the present invention heat is recovered from the exhaust of a first or high temperature evaporator containing condensible vapor and noncondensible gas and utilized for a preliminary low temperature evaporation of the feed which is injected into the first evaporator. This is accomplished primarily by transferring heat in the manner hereinafter described from the exhaust of the high temperature unit to the feed stream of a space evaporator wherein heated liquid passes through packing counter-currently to a draft of air or other noncondensible gas into which partial evaporation takes place, the space evaporator feed stream comprising dilute process feed and recycled space evaporator effluent. The resultant partially concentrated feed, the effluent of the space evaporator, is in part recycled with the process feed and the remainder passed through the main evaporator for concentration at a higher temperature.

The method and apparatus of this invention, shown schematically in the drawings, will be described for convenience in terms of continuous heating and evaporation of an aqueous process feed liquid containing a relatively non-volatile acid, base or salt as the solute. A typical case would be waste steel pickling liquor containing mainly dilute sulphuric acid and ferrous sulfate. The main elements of the apparatus shown in the drawings are the primary or high temperature evaporator 10; the secondary or space evaporator 11; the primary condenser 12; and the secondary condenser 13, which, though not essential, has advantages hereinafter described.

The structures of the space evaporator 11, and condensers 12 and 13 are essentially the same, comprising a tower or enclosure, provided with a section filled with raschig rings, berl saddles, or other suitable packing material or means for bringing a gaseous stream into intimate contact with liquid, a liquid inlet device above the packed section for distributing liquid feed over the packing, a gas inlet below and gas outlet or vent above the packed section, a sump space below the packing, and suitable liquid outlets from the sump space. In these structures material and energy exchangers between the film of liquid wetting the packing and the counter-current of gas stream passed therethrough are effected rapidly and efficiently.

Through the primary evaporator feed line 15 liquid preheated and partially concentrated, as is hereinafter explained, is introduced into the primary evaporator 10 where it is evaporated to the desired ultimate concentration, preferably by means of a submerged combustion burner 16, supplied through a fuel mixing and control device 17 with a fuel-air mixture, as from the gas line 18 and compressed air line 19. The hot flue exhaust, comprising some noncondensible products of combustion and the water vapor produced in the evaporator 10, passes through a mist eliminator box 21 and hot flue gas line 22 into the bottom of the primary condenser 12, wherein it passes upwardly through the packing 24, counter-currently to descending cool condensing water injected into the condenser through the distributing inlet 25, to pass out through the cool flue gas outlet or vent line 26 to the secondary condenser 13. A body of hot water, comprising the condensing water introduced to the top of the condenser and water condensed from the hot flue gases, collects in the condensing liquid sump space 12a in the bottom of the primary condenser, whence a portion is drawn by a recycling circuit through the outlet line 27 by pump 28 for delivery through line 29 to the heat exchanger 30, wherein it transfers heat and is thereby cooled before recycling through the line 31 to the condenser water inlet 25. Excess hot distilled water, corresponding in volume to the water condensed from the hot flue gas, passes through a water level overflow control device 33, establishing the water level in the bottom of the primary condenser, line 34, and cold process feed heater 35 to the condensate outlet line 36 for waste or use as plant conditions may warrant.

Cold process feed entering through line 40 preferably passes through the heater 35, where it recovers heat from the overflow from primary condenser 12, and through line 41 to the pump inlet 43, where it is mixed with a portion of the partially concentrated liquid effluent recycled through line 44 from the sump space 11a in the bottom of space evaporator 11 to provide the space evaporator feed stream. This stream is moved by pump 45 through line 46, the heat exchanger 30, and line 47 to the distributing inlet 48 of the space evaporator 11. In the heat exchanger 30, the feed stream to the space evaporator cools the water recycled to the condenser inlet 25 and in turn is heated raising the vapor pressure of the solvent in the feed. Thus the water directed to exchanger 30 and the heat transfer walls in 30 serve as media carrying heat from the hot flue gas to the secondary evaporator feed. The heated feed introduced through the space evaporator distributing inlet 48 passes downward through the packing 49, wherein it meets a counter-current blast of air or other noncondensible gases delivered by fan 50 to the air or gas inlet 51 beneath the packing. Evaporation of water from the heated feed takes place from the film of heated liquid distributed over the packing, and water vapor is carried out in the air stream from the space evaporator 12 through warm moist air discharge or vent line 52 to the secondary condenser 13. A body of partially concentrated feed liquid, cooled by space evaporation, gathers in the bottom of evaporator 11. The major portion of this liquid is continually withdrawn from and returned to the evaporator 11 in a recycling circuit, i. e., through the recycling line 44 to be mixed with incoming feed for re-heating in heat exchanger 30 and recycling therewith to the space evaporator feed inlet 48. The remainder of the liquid is delivered to the primary evaporator 10, preferably being passed through a heat exchanger wherein it is heated by the product stream leaving the primary evaporator. Hence the portion of the liquid to be fed to the primary evaporator passes off through the space evaporator liquid level control device 54, and line 55, to the pump 56, which discharges the cooled partially concentrated liquid through line 57, heat exchanger 58, and line 15 to the primary evaporator 10. In the heat exchanger 58 it is heated by the hot concentrated product liquid drawn off from the main evaporator 10 through line 59. The concentrated product stream cooled in heat exchanger 58 leaves the system through product outlet line 60. The recycle ratio, that is the ratio of liquid drawn off from the space evaporator 11 through line 44 to that drawn off through line 55 is usually relatively high, on the order of 4/1 to 7/1.

Through the secondary condenser 13 the moist flue gas from the primary condenser vent or outlet line 26 and the warm, moist air from the space evaporator vent or outlet line 52 pass upward through the packing 62 counter-currently to condenser water, introduced through the distributing inlet line 63, to exhaust through the stack or vent 64. The cooling water and admixed condensate may be withdrawn from the sump space 13a in the bottom of condenser 13 through the hot water outlet line 65 for use wherever suitable in the plant wherein the system is installed. Though not a necessary element of the system, the secondary condenser is advantageous both in recovering additional heat and further in preventing discharge of large volumes of steam from the exhaust lines 26 and 52 of the primary and secondary condensers.

The use of submerged combustion heating in the primary evaporator is of particular advantage since the combustion of the primary energy source—oil or gas—takes place in the body of liquid to be evaporated thereby eliminating losses in energy transfer such as occur in transferring heat by steam or other media from a boiler to the evaporator. Further the hot products of combustion give up heat to the body of liquid to be concentrated; and moreover, in passing through the hot liquid, have an effect similar to air distillation. However, with other types of heating, the same economy of the heat put into the primary evaporator is attained.

Instead of using in primary condenser 12 a recycled cooling liquid indentical with the solvent of the solution evaporated in evaporator 10, a liquid immiscible with the solvent and relatively non-volatile may be used, preferably one which has a higher specific gravity than the condensed solvent. The immiscible condensate and cooling liquid then separate into layers in the bottom of condenser 12, the cooling liquid and condensate outlets being positioned to decant the two layers separately. With such liquids, as heat carrying media, the heat exchanger 30 may be a direct contact exchanger.

Where found desirable, the heat recovered from the hot flue gas of primary evaporator 10 may be used to heat a liquid other than the feed being concentrated in the primary evaporator by passing the liquid drawn from condenser outlet 27 through a heat exchanger such as 30 through which is passed the liquid to be heated; and likewise, by passing the primary evaporator feed directly to the primary evaporator, for example through 57, another liquid introduced at 40 or 41 may be concentrated in space evaporator 11 for discharge at 54.

The materials and elements of the system—piping, packing, heat exchangers, condensers and evaporators are such as are known to the art, and are chosen for heat and corrosion resistance according to the liquid being concentrated. The relative proportions of the fuel, flue gas, air, process feed liquid and condenser water and the recycling ratios are of course primarily dependent upon the composition of the process feed liquid and desired concentrated product composition. Though described in terms of counter current flow, concurrent flow may be used, though generally less efficient, for obtaining higher flow rates where such may be desired. Valving and other means for controlling the flow rate relations of the various materials in the process, being well known to the art, have been omitted from the drawing and description for the sake of simplicity. Depending upon the relative temperatures necessary in the system for processing a particular solution, the loci of the heat exchangers may be advantageously varied, for example, 35 might be included in the primary evaporator feed line or 58 in the process feed line.

I claim:

1. An apparatus for the evaporation and concentration of solutions including a secondary space evaporator vessel for partially concentrating solution fed into the system, said space evaporator having inert gas inlet and outlet ports, a feed liquid inlet, means disposed between said gas ports adapted to bring inert gas and feed liquid passed through said vessel into intimate contact, and a liquid sump to receive liquid passed through said means; inert gas draft causing means associated with said space evaporator vessel; a recycling circuit for said space evaporator, comprising a recycle pump having a pump inlet port in communication with said sump, space evaporator vessel feed conduit means connecting the discharge port of said pump to said feed liquid inlet; a process feed line opening to said recycling circuit for introducing to the apparatus the solution to be concentrated; a primary evaporator for evaporating, to a desired product concentration, solution partially concentrated by said space evaporator, said primary evaporator having a liquid inlet, product liquid outlet, liquid heating means to vaporize solvent from solution fed to the primary evaporator, and a solvent vapor-gas outlet; primary evaporator feed conduit means connecting said sump and said primary evaporator liquid inlet; and heat transfer means interposed between said vapor-gas outlet of the primary evaporator and said recycling circuit and adapted to effect transfer of heat energy from solvent vapors produced by said primary evaporator to space evaporator feed liquid, said transfer means including a heat exchanger in said recycle circuit, a vapor condenser having a vapor-gas inlet in communication with said vapor-gas outlet of the primary evaporator, said vapor condenser also having a condensing liquid inlet and a condensing liquid sump and means interposed between the last mentioned sump and condensing liquid inlet adapted to bring vapor and condensing liquid into intimate contact for condensing said vapors, and pump and conduit means for recycling liquid from said condensing liquid sump through said heat exchanger to said condensing liquid inlet.

2. An apparatus as described in claim 1 having a second heat exchanger included in the said process feed line, and a condensate line for passing liquid from said condensing liquid sump, corresponding in amount to vapor condensed in said condenser, to said second heat exchanger.

3. An apparatus for the evaporation and concentration of solutions including a secondary space evaporator vessel for partially concentrating solution fed into the system, said space evaporator vessel having inert gas inlet and outlet ports, a feed liquid inlet, means disposed between said gas ports adapted to bring inert gas and feed liquid passed through said vessel into intimate contact, and a liquid sump space to receive liquid passed through said means; inert gas draft causing means associated with said space evaporator vessel; a recycling circuit for said space evaporator vessel, comprising a recycle pump having a pump inlet port in communication with said sump space, and space evaporator vessel feed conduit means connecting the discharge port of said pump to said feed liquid inlet; a process feed line opening to the said recycling circuit for introducing to the apparatus the solution to be concentrated; a primary evaporator for evaporating, to a desired product concentration, solution partially concentrated by said space evaporator vessel, said primary evaporator having a liquid inlet, product liquid outlet, liquid heating submerged combustion means to vaporize solvent from solution fed to the primary evaporator, and a solvent vapor-gas outlet; a primary evaporator feed line connecting said sump space and said primary evaporator liquid inlet; and heat transfer means interposed between said vapor-gas outlet of the primary evaporator and said recycling circuit and adapted to effect transfer of heat energy from solvent vapors produced by said primary evaporator to space evaporator vessel feed liquid, said transfer means including a heat exchanger in said recycle circuit, a vapor condenser having a vent and a vapor-gas inlet with the latter in communication with said vapor-gas outlet of the primary evaporator, said vapor condenser also having a condensing liquid inlet and contact means interposed between said vent and vapor-gas inlet adapted to bring vapor and condensing liquid into intimate contact for condensing said vapor, a condensing liquid sump to receive liquid passed through said contact means and liquid resulting from condensation of vapors therein, and pump and conduit means for recycling liquid from said condensing liquid sump through said heat exchanger to said condensing liquid inlet.

4. A process for continuous evaporation of a solution comprising the steps of: combining dilute solution fed into the process with a portion of partially concentrated solution produced in a subsequent secondary evaporation step of the process hereinafter described thereby to form a secondary evaporation feed stream, heating the secondary evaporation feed stream with heat recovered as hereinafter described from a subsequent step of the process, partially evaporating the heated secondary evaporation feed stream in a secondary evaporation step by bringing a stream of inert gas into intimate contact therewith whereby solvent from the heated secondary evaporation feed stream passes into and is carried away by the inert gas, thereby to form the said partially concentrated solution, heating a feed stream comprised of the remainder of said partially concentrated solution to evaporate the solvent therefrom until a desired product concentration is reached, recovering heat from the vapors produced in the last mentioned heating step by bringing said vapors into intimate contact with a relatively cool stream of condensing liquid to condense vapor and thereby heat the liquid, transferring heat from the heated liquid to the secondary evaporation feed stream in the first mentioned heating step thereby recooling the condensing liquid, recycling a portion of the recooled condensing liquid as said cool stream, and transferring heat from a portion of the heated condensing liquid, corresponding in amount with the vapor condensed, to dilute solution fed into the process.

5. A process for continuous evaporation of a solution comprising the steps of: combining dilute solution fed into the process with a portion of partially concentrated solution produced in a subsequent secondary evaporation step of the process hereinafter described thereby to form a secondary evaporation feed stream, heating the secondary evaporation feed stream with heat recovered as hereinafter described from a subsequent step of the process, partially evaporating the heated secondary evaporation feed stream in a secondary evaporation step by bringing a stream of inert gas into intimate contact therewith whereby solvent from the heated secondary evaporation feed stream passes into and is carried away by the inert gas, thereby to form said partially concentrated solution, heating by submerged combustion a feed stream comprised of the remainder of said partially concentrated solution to evaporate the solvent therefrom until a desired product concentration is reached, and recovering heat from hot flue gas produced in the last mentioned heating step and comprising combustion products and condensible vapors by bringing said flue gas into contact with a heat absorbing medium for carrying heat to the first mentioned heating step.

6. A process for continuous evaporation of a solution comprising the steps of: combining dilute solution fed into the process with a portion of partially concentrated solution produced in a subsequent secondary evaporation step of the process hereinafter described thereby to form a secondary evaporation feed stream, heating the secondary evaporation feed stream with heat recovered as hereinafter described from a subsequent step of the process, partially evaporating the heated secondary evaporation feed stream in a secondary evaporation step by bringing a stream of inert gas into intimate contact therewith whereby solvent from the heated secondary evaporation feed stream passes into and is carried away by the inert gas thereby to form said partially concentrated solution, heating by submerged combustion a feed stream comprised of the remainder of said partially concentrated solution to evaporate the solvent therefrom until a desired product concentration is reached, recovering heat from the hot flue gas produced in the last mentioned heating step and comprising solvent vapors and combustion products by bringing said flue gas into contact with a relatively cool stream of condensing liquid to condense vapor and heat the liquid, transferring heat from the heated liquid to the secondary evaporation feed stream in the first mentioned heating step thereby recooling the condensing liquid, and recycling at least a portion of the recooled liquid as said cool stream.

7. An apparatus for the continuous evaporation and concentration of solutions including: a secondary space evaporator vessel for partially concentrating solution fed into the system, said space evaporator vessel having an inert gas inlet, a feed liquid inlet and gas outlet above said gas inlet, means disposed between said gas outlet and inlet adapted to bring inert gas and feed liquid into intimate contact, and a liquid sump space below said means; inert gas draft causing means associated with said space evaporator vessel; a recycling circuit for said space evaporator vessel comprising conduit means putting said sump space in communication with said feed liquid inlet and a recycle pump included in said conduit means for moving partially concentrated solution from said sump space to said feed liquid inlet; a process feed line opening to the inlet side of said pump for introducing to the apparatus the solution to be concentrated; a primary evaporator for evaporating, to a desired product concentration solution partially concentrated by said space evaporator vessel, said primary evaporator having a liquid inlet, product liquid outlet, submerged combustion liquid heating means to vaporize solvent from solution fed to the primary evaporator, and a solvent vapor-gas outlet; a primary evaporator feed line connecting said sump space and said primary evaporator liquid inlet; and heat transfer means interposed between said vapor-gas outlet of the primary evaporator and said recycling circuit and adapted to effect transfer of heat energy from solvent vapors produced by said primary evaporator to space evaporator vessel feed liquid; said heat transfer means comprising a heat exchanger included in said recycle circuit, a vapor condenser having a vapor-gas inlet connected to said vapor-gas outlet, a condensing liquid inlet above said vapor-gas inlet, packing means interposed between said condensing liquid and vapor-gas inlets adapted to bring vapors and products of combustion produced by said burner into intimate contact with condensing liquid for condensing said vapor and effecting heat exchange between the products of combustion and said condensing liquid, a condensing liquid sump beneath said vapor-gas inlet, and a pump and conduit means for recycling liquid from said condensing liquid sump through said heat exchanger to said condensing liquid inlet.

8. An apparatus for the evaporation and concentration of solutions including a secondary space evaporator vessel for partially concentrating solution fed into the system, said space evaporator vessel having inert gas inlet and outlet ports, a feed liquid inlet, means disposed between said gas ports adapted to bring inert gas and feed liquid passed through said vessel into intimate contact, and a liquid sump to receive liquid passed through said means; inert gas draft causing means associated with said space evaporator vessel; a recycling circuit for said space evaporator, comprising a recycle pump having a pump inlet port in communication with said sump, space evaporator vessel feed conduit means connecting the discharge port of said pump to said feed liquid inlet; a process feed line opening to the said recycling circuit for introducing to the apparatus the solution to be concentrated; a primary evaporator for evaporating, to a desired product concentration, solution partially concentrated by said space evaporator vessel, said primary evaporator having a liquid inlet, product liquid outlet, submerged combustion burner liquid heating means to vaporize solvent from solution fed to the primary evaporator, and a solvent vapor outlet; a primary evaporator feed line connecting said sump to said primary evaporator liquid inlet; and heat transfer means interposed between said vapor outlet of the primary evaporator and said recycling circuit and adapted to effect transfer of heat energy from solvent vapors produced by said primary evaporator to space evaporator vessel feed liquid.

9. An apparatus for the evaporation and concentration of solutions including a secondary space evaporator vessel for partially concentrating solution fed into the system, said vessel having an inert gas inlet, a feed liquid inlet, a gas outlet, means disposed between said gas outlet and gas inlet adapted to bring inert gas and feed liquid into intimate contact, and a liquid sump below said means; inert gas draft causing means associated with said space evaporator vessel; a recycling circuit for said space evaporator comprising conduit means putting said sump in communication with said feed liquid inlet and a recycling pump included in said conduit means for moving solution from said sump to said feed liquid inlet; a process feed line opening to the inlet side of said recycling pump for continuously introducing to the apparatus the solution to be concentrated; a primary evaporator for evaporating, to a desired product concentration, solution partially concentrated by said space evaporator vessel; said primary evaporator having a liquid inlet, product liquid outlet, submerged combustion heating means to vaporize solvent from solution fed to the primary evaporator, and a flue gas outlet for flue gas comprised of solvent vapor and gaseous combustion products; a primary evaporator feed line connecting the space evaporator sump and said primary evaporator liquid inlet; heat transfer means interposed between said vapor outlet of the primary evaporator and said recycling circuit, said heat transfer means including a vapor condenser having a flue gas inlet in communication with said flue gas outlet, a vent, a condensing liquid inlet, a packing section interposed between said vent and flue gas inlet for bringing flue gas and condensing liquid into intimate contact, and a condensing liquid sump to receive condensing liquid and condensate from said packing section; said heat transfer means further including a heat exchanger in said conduit means, a second pump and recycle line for recycling a stream of liquid from said condensing liquid sump to said condensing liquid inlet through said heat exchanger, whereby said stream is cooled and the space evaporator feed heated; a second heat exchanger in said process feed line and a conduit for drawing excess liquid from said condensing liquid sump through the last said heat exchanger; and a third heat exchanger in the primary evaporator feed line for effecting heat exchange with concentrated solution from said product outlet.

10. An apparatus as described in claim 9 having the inert gas outlet of said space evaporator vessel and the vent of said condenser opening through gas inlet means of a second condenser like to the first said condenser, and means for introducing a cooling liquid to the second condenser.

References Cited in the file of this patent

UNITED STATES PATENTS

| | | |
|---|---|---|
| 1,216,187 | Trump | Feb. 13, 1917 |
| 1,829,477 | Douthitt | Oct. 27, 1931 |
| 1,831,892 | Thompson | Nov. 17, 1931 |
| 2,042,488 | Theiler | June 2, 1936 |
| 2,150,860 | Hughes | Mar. 14, 1939 |
| 2,334,563 | Lavine et al. | Nov. 16, 1943 |
| 2,449,587 | Chambers | Sept. 21, 1948 |
| 2,510,233 | Kermer | June 6, 1950 |

FOREIGN PATENTS

| | | |
|---|---|---|
| 163,549 | Great Britain | May 26, 1951 |
| 349,567 | Great Britain | May 13, 1931 |